United States Patent
Bullinger et al.

(10) Patent No.: US 6,851,716 B2
(45) Date of Patent: Feb. 8, 2005

(54) BELT TIGHTENER

(75) Inventors: Wilfried Bullinger, Korntal-Muenchingen (DE); Walter Eberle, Hochdorf (DE); Christian Mayer, Ditzingen (DE); Markus Woldrich, Ditzingen (DE); Kai Wustlich, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 198 days.

(21) Appl. No.: 10/303,069

(22) Filed: Nov. 25, 2002

(65) Prior Publication Data

US 2003/0116956 A1 Jun. 26, 2003

(30) Foreign Application Priority Data

Nov. 30, 2001 (DE) .......................................... 101 58 871

(51) Int. Cl.⁷ .............................................. B60R 22/46
(52) U.S. Cl. ....................... 280/806; 280/807; 242/374
(58) Field of Search ................................ 280/806, 807; 242/372, 374, 375, 375.1; 297/475, 476, 477

(56) References Cited

U.S. PATENT DOCUMENTS

| | | | |
|---|---|---|---|
| 4,026,494 A | | 5/1977 | Tanaka |
| 5,316,233 A | | 5/1994 | Hiramatsu |
| 5,788,281 A | * | 8/1998 | Yanagi et al. ................ 280/806 |
| 6,149,093 A | * | 11/2000 | Kwag .......................... 242/372 |
| 6,343,759 B1 | | 2/2002 | Specht |
| 6,431,485 B2 | * | 8/2002 | Mitsuo et al. .............. 242/372 |
| 6,513,747 B1 | * | 2/2003 | Lee et al. .................... 242/374 |
| 6,598,821 B2 | * | 7/2003 | Specht ........................ 242/374 |

FOREIGN PATENT DOCUMENTS

| | | |
|---|---|---|
| DE | 30 19 298 A1 | 11/1981 |
| DE | 199 61 799 A1 | 7/2001 |
| DE | 100 13 870 A1 | 10/2001 |
| EP | 0 893 313 A2 | 1/1999 |
| EP | 1 157 905 A2 | 11/2001 |

OTHER PUBLICATIONS

European Search Report dated Nov. 5, 2003.

* cited by examiner

*Primary Examiner*—David Dunn
(74) *Attorney, Agent, or Firm*—Crowell & Moring LLP

(57) ABSTRACT

A belt tightener of a seat belt in a vehicle, in particular a motor vehicle, is provided with a retracting spring in order to return the belt. A counterspring, which can be adjusted by a motor, is connected in parallel with the retracting spring in order to be able to reduce the tensile force of the belt for comfort considerations. The motor can also be connected in drive terms to the belt via a coupling arrangement to give reversible belt tightening.

36 Claims, 3 Drawing Sheets

BELT TIGHTENER

This application claims the priority of German application 101 58 871.2, filed Nov. 30, 2001, the disclosure of which is expressly incorporated by reference herein.

BACKGROUND AND SUMMARY OF THE INVENTION

The present invention relates to a belt tightener of a seat belt for an occupant on a seat in a vehicle, in particular a motor vehicle. The belt tightener has a retracting device, which is actuated by a retracting spring, for automatic shortening of the belt, and an extension lock of the belt, which lock is effective at predetermined parameters, in particular at a predetermined deceleration or acceleration of the vehicle or of its bodywork and/or when a predetermined extension speed of the belt is exceeded. An irreversible tensioning device is preferably provided. On obtaining an accident signal, which can be produced by a sensory mechanism, for example a signal for triggering an airbag, briefly, for example for 10 to 15 ms, the irreversible tensioning device brings about an irreversible tightening of the belt with great force, for example 4000 N.

In a belt tightener of this type currently used as standard in motor vehicles, the retracting device is actuated by a spiral spring which has a structurally predetermined pre-stress when the belt is pulled in and, when the belt is extended, is increasingly stressed in accordance with its spring characteristic.

The extension lock operates using mechanical catch elements. The latter are controlled, on the one hand, by inertial elements which are shifted from a catch-ineffective position into a catch-effective position if forces acting on the vehicle bodywork bring about a bodywork acceleration or deceleration exceeding a small threshold value. On the other hand, centrifugal elements are deflected from a catch-ineffective position into a catch-effective position if a reel, which is used for accommodating the belt, is rotated at a rotational acceleration exceeding a threshold value or jerkily in the extension direction of the belt. This ensures that the belt is securely locked against (further) extension of the belt in the case of danger-prone driving situations or even accidents.

In view of the fact that the driver and/or—in particular—the front passenger of a vehicle can at least temporarily take up a position outside the normal or desired seat position, irreversible tensioning devices are assigned to the belt tighteners, at least in higher quality vehicles, which devices typically operate pyrotechnically and are triggered if a corresponding sensory mechanism "reports" a collision of the vehicle or triggers an airbag present in the vehicle. These irreversible belt tighteners are used for shortening the seat belt with great force. In this manner, any slack in the belt against the occupant's body and at or on the belt reel is eliminated and also, once a previously triggered airbag is relaxed, ensures optimum safety for the particular occupant in respect of possible secondary collisions. In each case, the occupant is kept as afar away as possible from hard structural parts of the vehicle bodywork.

In order to improve the comfort, it is known, according to German publication DE 39 38 081 A1, to assign an electric motor to the spring provided for actuating the retracting device, in order to adjust the relatively stationary abutment of the retracting spring. In this manner, the belt tension can be changed and the effect can be achieved, in particular, that even with a greatly extended belt, as is necessary if the occupant is of above-average height or plumpness, the belt tension remains low and, accordingly, the wearing comfort is improved. As soon as the belt is withdrawn for winding-up purposes, the relatively stationary abutment is withdrawn into a starting position by the abovementioned motor, so that the belt can be wound up safely.

Similar arrangements are the subject matter of German publications DE 41 12 620 A1, DE 195 01 076 A1 and of international publication WO 01/85495 A2. The last-mentioned publication reveals a belt tightener having a retracting spring, an electric motor which can be activated in a danger situation and a pyrotechnical tightening device.

One object of the invention is to provide a belt tightener which is improved both in respect of comfort and in respect of safety.

This object is achieved according to the invention in the case of a belt tightener of the type mentioned above by including a counterspring having a belt-remote abutment which can be adjusted by a motor arranged parallel to the retracting spring, and a normally open coupling arranged between the motor and the retracting device. The motor can be reversed between two power ranges, and the coupling closes automatically if the motor switches to high power and operates in its running direction provided to give reversible belt tightening.

One general concept of the invention is that of driving the retracting device when the need arises, i.e. in the case of a danger situation determined by sensors, to give reversible tightening of the belt in such a manner that any belt slack which is present is completely withdrawn and the belt is effectively always tightened before an accident can arise from the danger situation. Danger situations can be recognized by sensor, for example, by the fact that the operating state of the vehicle brake and/or accelerations of the vehicle in the longitudinal and transverse direction are detected. A severe brake actuation and/or severe accelerations or decelerations of the vehicle point to hazardous situations.

By means of the reversible belt tightening provided according to the invention, significantly increased safety can therefore be ensured. In particular, the irreversible tensioning device can act more rapidly, so that the occupant is retained at a very early point by the belt during an accident.

On the other hand, the motor, which is provided for the reversible tightening of the belt, provides, by means of its connection or connectability in terms of drive to the belt-remote abutment of the counterspring, the possibility of ensuring particularly great comfort in normal driving situations by the motor adjusting the belt-remote abutment of the counterspring with the effect of reducing the effective tension of the retracting spring, so that the occupant virtually does not notice the belt. In the case of possible movements of the occupant, the belt-remote abutment of the counter-spring can temporarily be released or can be adjusted with the effect of increasing the effective pull-back force of the retracting spring, in order to improve the belt retraction which may be necessary.

In a similar manner the tension of the counterspring can also be reduced, and therefore the effective tension of the retracting spring increased, if the belt is released from the belt buckle or remains unused. The belt can thereby be rapidly shortened when not in use and can be kept in the non-use state by means of relatively strong spring force.

The motor provided for adjusting the spring abutment of the counterspring therefore has multiple functions. Firstly, it can improve the wearing comfort of the belt and also facilitate the use of the belt. Secondly, the motor can immediately set a greatly increased belt tension in a danger situation in order to "prepare" the belt system for a possible accident.

According to a preferred embodiment, the motor and/or its driving connection to the belt-remote abutment of the counterspring are designed to be self-locking, so that the set position of the spring abutment is maintained without supply of energy when the motor is at a standstill.

According to a particularly preferred embodiment of the invention, a further coupling is arranged between the motor and the belt-remote abutment of the counterspring, which coupling closes if the motor runs counter to its running direction for the reversible belt tightening.

The coupling, which closes in the case of the reversible belt tightening, is preferably designed as a gradient coupling which is only capable of closing given sufficient differences in speed between the coupling inlet and coupling outlet.

If appropriate, the abovementioned coupling may also be designed as a centrifugal coupling.

In an expedient refinement, a clamping-roller freewheeling device having a braked clamping-roller cage may be provided for this purpose.

Otherwise, with regard to preferred features of the invention reference is made to the claims and the following explanation of the drawing which will be used to describe a particularly preferred embodiment of the invention in greater detail.

DETAILED DESCRIPTION OF THE INVENTION

Figure 1:
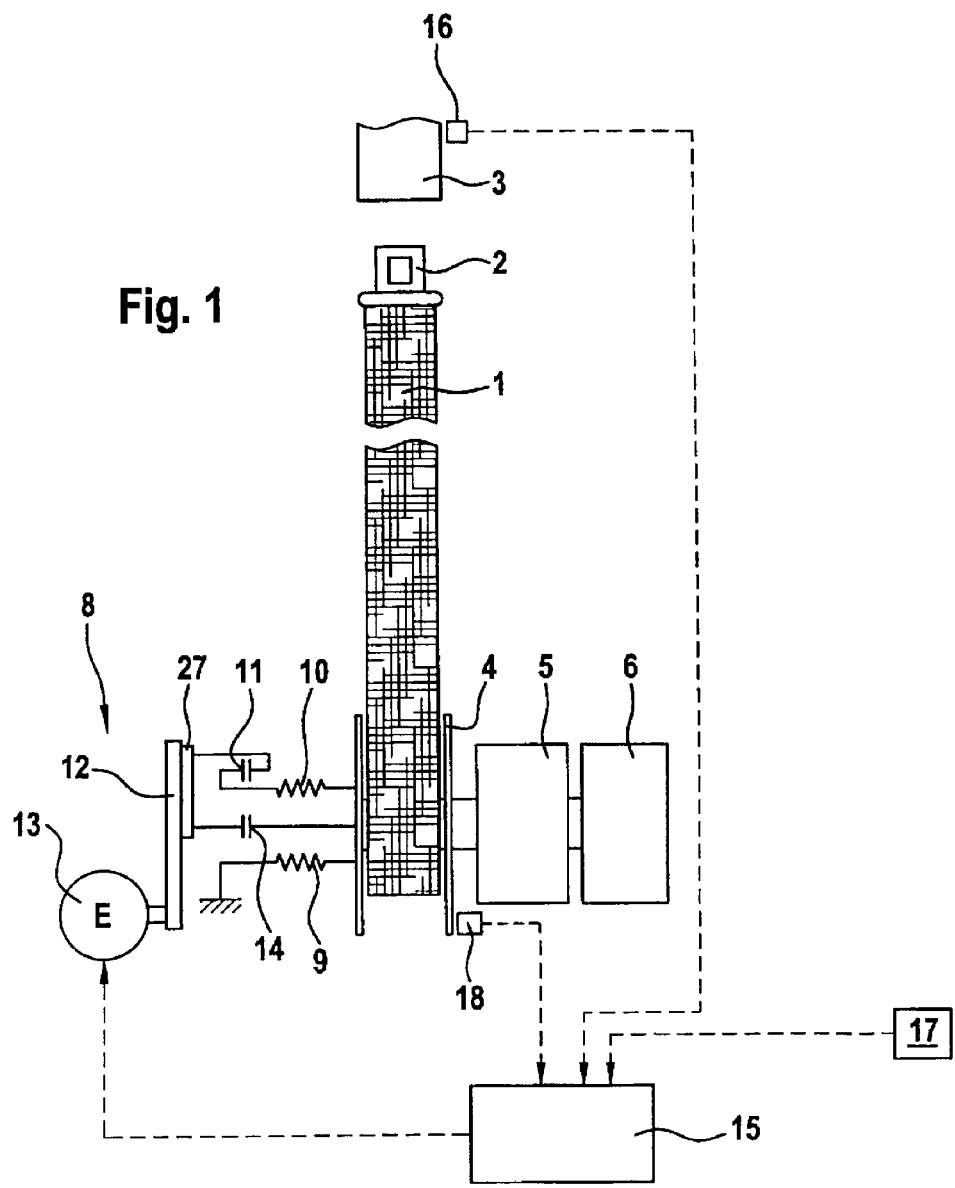
FIG. 1 shows a diagrammatic illustration of a belt tightener system according to the invention.

According to FIG. 1, a seat belt 1 has, in a known manner, a buckle latch 2 which is fastened to it and can be introduced in the customary manner into a belt buckle 3 and can be separated from the belt buckle 3. The seat belt 1 is wound up on a reel in such a manner that the seat belt 1 has the respectively desired and required length. This will be explained in greater detail further below.

The reel 4 is assigned, in a known manner, a mechanical extension lock 5 which locks the reel 4 against rotation in the unwinding direction of the seat belt 1 if the rotational speed of the reel 4 and/or the acceleration or deceleration of the vehicle, in which the seat belt 1 is arranged, exceed a threshold value.

Furthermore, the reel 4 can be assigned an irreversible tensioning device 6 which operates in a known manner pyrotechnically and is ignited if a sensory mechanism on the vehicle recognizes a collision or an immediately imminent collision of the vehicle. In this case, the tensioning device 6 brings about irreversible belt tightening with very great force, for example 4000 N. The effect which can be achieved thereby is that the occupant secured by the seat belt 1 is protected to a particular extent against collisions with interior parts of the vehicle.

In addition, the reel 4 is equipped with a retracting device 8 parallel to the extension lock 5, in order to be able to wind up and shorten the seat belt 1 when not in use if the occupant has extended the belt on account of a movement of his/her body and moves back again into his/her desired seat position.

The retracting device 8 has, for this purpose, a retracting spring 9 which is designed as a spiral spring, as will be illustrated further below, one end of the retracting spring 9 being connected fixedly to the reel 4 or to a shaft (not illustrated in FIG. 1) which is rotationally fixed with respect thereto, and the other end of the retracting spring 9 being connected fixedly to a stationary abutment.

A counterspring 10 is arranged parallel to the retracting spring 9, which counterspring can likewise be designed as a spiral spring, but with an opposite coil direction with respect to the retracting spring 9, one end of the counterspring being connected fixedly to the reel 4 or to the shaft connected in a rotationally fixed manner thereto, while the other end of the counterspring 10 is connected fixedly to the outlet of a coupling 11, the inlet of which is drive-connected to an electric motor 13 via a driving connection 12, for example a toothed belt mechanism. The driving connection 12 and/or the electric motor are designed to be self-locking.

Parallel to the coupling 11 and to the counterspring 10, which is arranged in series therewith, a further coupling 14 is arranged between the driving connection 12 and the reel 4 or the shaft connected in a rotationally fixed manner thereto, which coupling closes automatically if the electric motor 13 is switched to a high power stage and rotates in accordance with the winding-up direction of the belt reel 4.

A control circuit 15 which is connected on the input side to a sensory mechanism for various operating parameters is used for controlling the power of the electric motor 13.

This sensory mechanism can have a sensor 16 on the buckle, the signal of which indicates whether the buckle latch 2 is inserted into the belt buckle 3 or not.

Furthermore, a sensor arrangement 17 is provided which permits dangerous or danger-prone driving situations to be detected. For example, the sensor arrangement 17 can detect the actuation of the accelerator pedal and brake pedal, the response of a brake-assisting device and the fluid pressure in the brake system, and therefore the actuating state of the vehicle brake of the vehicle. In addition or as an alternative, the sensor arrangement 17 can also recognize and evaluate parameters dynamic for driving purposes, such as, for example, transverse acceleration, yaw rate, steering angle and/or vehicle decelerations.

In addition, a rotary transmitter 18 or another sensor can be provided, the signals of which show whether the reel 4 of the seat belt 1 is being rotated or the seat belt 1 is being moved in the pull-in or extension direction.

The control circuit 15 operates as follows:

The initial starting point is that the sensor arrangement 17 does not report a dangerous state. In addition, the occupant may have put his seat belt on and may not have moved significantly for a relatively long time.

The control circuit 15 can determine this state from the signals of the sensor 16 on the belt buckle 3 and of the sensor 18 on the reel 4. The electric motor 13 is then activated in such a manner that it rotates in its direction of rotation for tensioning the counterspring 10. In this direction of rotation the coupling 11 closes while the coupling 14 opens or remains open. The counterspring 10 is set to a more or less high tension in accordance with the rotational travel of the motor 13. Since the tension of the counterspring 10 counteracts the tension of the retracting spring 9, the abovementioned adjusting travel of the electric motor 13 has the consequence that the retracting force which is effective and can be sensed at the seat belt 1 is correspondingly reduced, for example to a low value of 2 N. In this manner, the wearing comfort of the belt 1 is quite substantially increased.

If the occupant bends forwards at a moderate speed, the seat belt 1 is correspondingly extended. This movement of the belt 1 is reported by the rotary transmitter 18 of the belt reel 4 and can cause the control circuit 15 to drive the electric motor 13 at low power in such a manner that the tension of the counterspring 10 is reduced and, accordingly, the retracting force exerted on the belt reel 4 by the retracting spring 9 is increased in order to wind up the belt 1. This ensures that the seat belt 1 readily follows the occupant if he/she moves back into his/her normal position from the position in which he/she is bent temporarily forwards.

After a predetermined interval after the last belt movement reported by the rotary transmitter 18, the motor 13 can then adjust the counterspring 10 again in such a manner that the belt tension is returned again to the very low value of, for example, 2 N.

The belt 1 thereby loads the occupant with an extremely low force virtually continuously.

If, during the journey, a dangerous or danger-prone driving state, for example a driving state with severe brake actuation, is reported by the sensor arrangement 17, the control circuit 15 reverses the motor 13 to a high power range in the pull-back direction of the seat belt 1 and of its reel 4, the normally open coupling 14 closing at the same time. The motor 13 therefore drives the reel 4 with great force, and the seat belt 1 is pulled tight with a correspondingly great force, for example 20 N or more. This reversible belt tightening ensures that the seat belt 1 bears tightly against the occupant's body and, in particular, any slack in the seat belt 1 which may be present or has been caused by the occupant is very rapidly withdrawn. Should an accident actually occur now, it is ensured that the occupant falls into a well-tightened seat belt 1.

If the belt latch 2 is released from the belt buckle 3, the sensor 16 produces a corresponding signal. This can result in the control circuit 15 again activating the motor 13 in such a manner that the latter runs at low power in that direction of rotation in which the tension of the counterspring 10 is reduced and the coupling 11, which has previously been closed if appropriate, is opened. In this manner, the spring tension of the retracting spring 9 is effective in an undiminished manner for retracting the seat belt 1, i.e. the seat belt 1 is rapidly and completely wound up and retained in the wound-up non-use state by the retracting spring 9.

Figure 2:
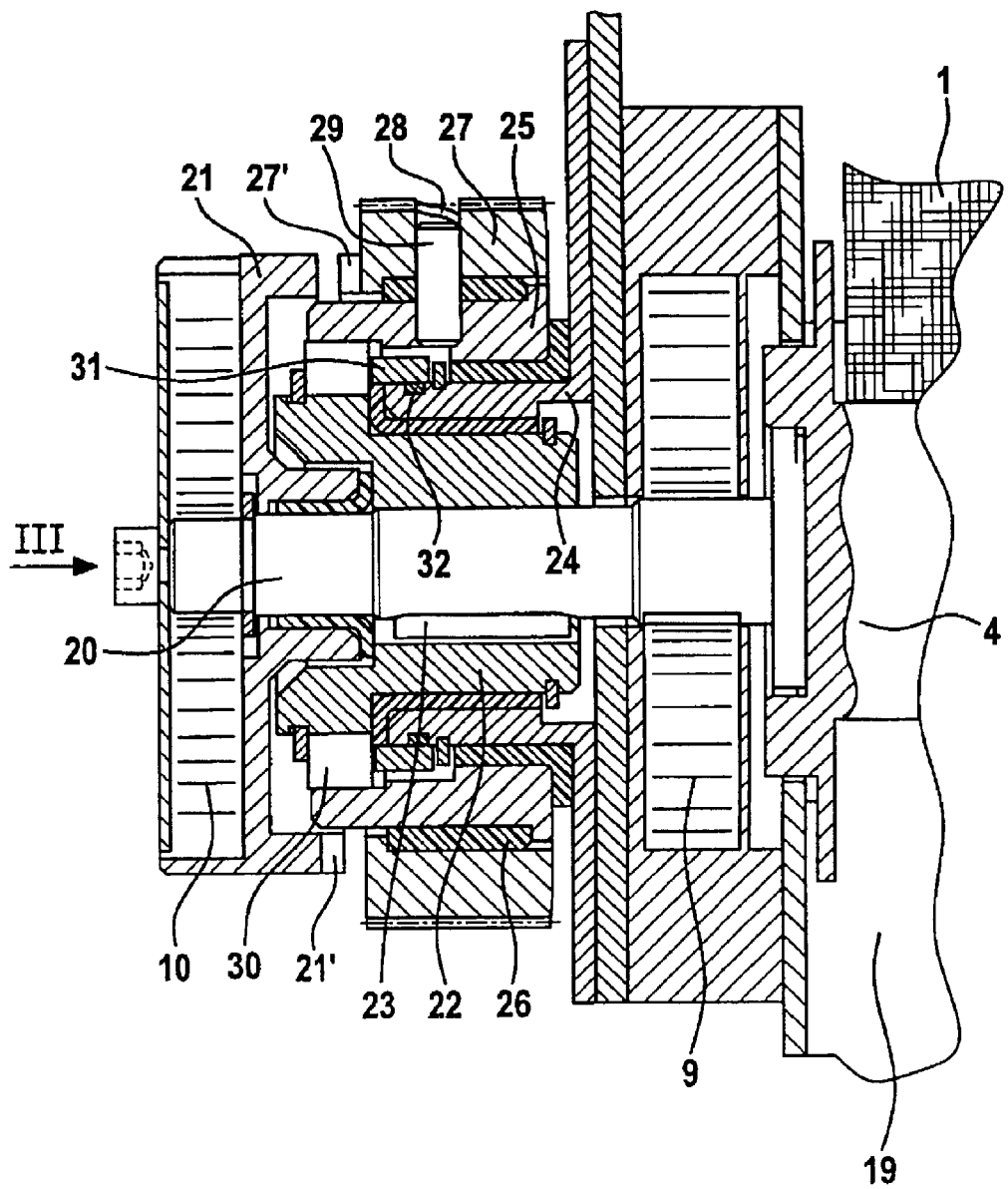
FIG. 2 shows an axial section of the retracting device with retracting spring, counterspring and coupling arrangements.
Figure 3:
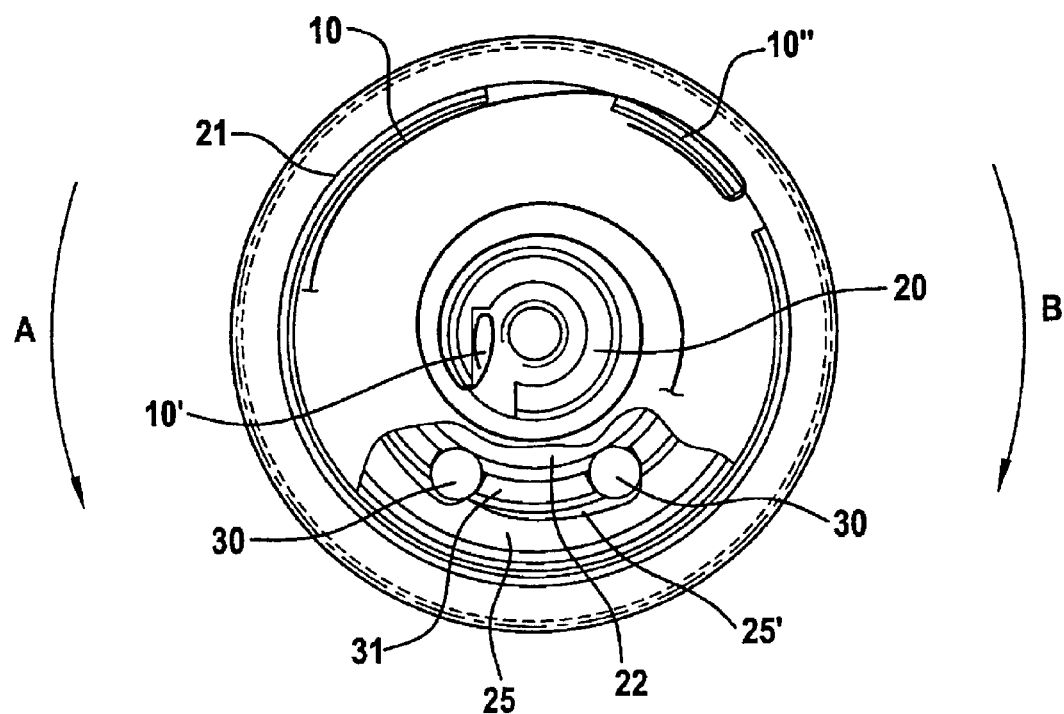
FIG. 3 shows a partially cutaway axial view of the retracting device corresponding to the arrow III in FIG. 2.

FIGS. 2 and 3 illustrate by way of example the manner in which the retracting device 8 can be designed together with retracting spring 9, counterspring 10 and couplings 11 and 14.

The reel 4, only part of which is illustrated in FIG. 2 and which is mounted rotationally on a frame 19, is connected via a shaft 20, which is connected in a rotationally fixed manner to it, to the radially inner end of the retracting spring 9 which is designed as a spiral spring and the radially outer end of which is secured in a stationary manner, i.e. fixed on the frame. Furthermore, the shaft 20 is connected to the radially inner end 10' of the counterspring 10 which is likewise designed as a spiral spring and the coil direction of which is opposite to the coil direction of the retracting spring 9. The radially outer end 10" of the counterspring 10 is fastened to a spring abutment 21 which is mounted rotationally on the shaft 20, is in the form of an internal geared wheel and is provided with an end toothing 21' on its side facing away from the counterspring 10.

Axially between the spring abutment 21 and the retracting spring 9, a sleeve part 22 is arranged in a rotationally fixed manner on the shaft 20, the rotationally fixed connection being ensured by a strip 23 which protrudes radially out of the shaft 20 and engages in a corresponding axial groove on the inner circumference of the sleeve part 22.

The sleeve part 22 is mounted rotationally, by means of a subregion of its outer circumference, in a stationary sleeve 24 with the interconnection of a sliding ring. Mounted rotationally on the outer circumference of the stationary sleeve 24, with the interconnection of a further sliding ring part, is a radially outer sleeve part 25 on whose outer circumference a gearwheel 27 is arranged rotatably and axially displaceably with the interconnection of a sliding sleeve 26.

This gearwheel 27 has an end toothing 27' which, given an appropriate, axial displacement of the gearwheel 27, engages in the end toothing 21' of the spring abutment 21 with a rotationally fixed coupling of the gearwheel 27 and spring abutment 21.

The ring-shaped gearwheel 27 is passed through radially by a slot 28 which is orientated obliquely with respect to the circumferential direction and interacts in the manner of a slotted guide with a pin 29 which protrudes radially outwards out of the sleeve part 25 and is arranged in a stationary manner relative to the sleeve part 25. If a torque thus occurs between the sleeve part 25 and the gearwheel 27, the gearwheel 27 will rotate relative to the sleeve part 25, in accordance with the size of the slot 28, in the circumferential direction of the gearwheel 27, in which case, depending on the direction of rotation, an axial displacement takes place to the right or left, in FIG. 2, the slot 28 being dimensioned in such a manner that the gearwheel 27 can engage with its end toothing 27' in the end toothing 21' of the spring abutment 21.

The axial end regions of the sleeve parts 22 and 25, which regions are on the left in FIG. 2, form together with clamping rollers 30, which are arranged radially between them, a clamping-roller freewheeling device, as will be explained below. The clamping rollers 30 are assigned a sleeve-like cage 31 whose one axial half has corresponding cutouts for receiving the clamping rollers 30 and whose other axial half can be rotated on the stationary sleeve 24 against braking resistance. The braking resistance is reduced by a friction ring 32 which is arranged in a circumferential groove of the stationary sleeve 24.

As can be gathered in particular from FIG. 3, that part of the sleeve part 22 which interacts with the clamping rollers 30 has a circular outer circumference while on that axial section of the inner circumference of the sleeve part 25 which interacts with the clamping rollers 30 clamping ramps 25' are formed in such a manner that the clamping rollers 30 are inevitably clamped between the sleeve parts 22 and 25 when the sleeve part 25 rotates relative to the clamping-roller cage 31 and to the sleeve part 22 in the arrow direction A.

The gearwheel 27 is, as is illustrated only in a diagrammatized manner in FIG. 1, drive-connected to the electric motor 13 via the driving connection 12.

If the gearwheel 27 in FIG. 3 is rotated in the arrow direction B, it is displaced axially to the left in FIG. 2, so that the end toothing 27' of the gearwheel 27 enters into engagement with the end toothing 21' of the spring abutment 21. In addition, during the abovementioned rotation of the gearwheel 27 in the arrow direction B the sleeve part 25 is rotated at the same time via the pin 29. As a result, therefore, firstly the gearwheel 27 is coupled to the spring abutment 21, so that on further rotation in the direction B the counterspring 10 is increasingly tensioned. Secondly, the clamping rollers 30 take up their free-wheeling position between the sleeve parts 22 and 25, i.e. the gearwheel 27 is uncoupled from the shaft 20.

On rotation of the gearwheel 27 in the arrow direction A, the gearwheel 27 is displaced axially to the right in FIG. 2, the end toothing 27' of the gearwheel 27 emerging out of the end toothing of the spring abutment 21 and releasing the spring abutment 21. The tension of the counterspring 10 can therefore be relaxed.

If the gearwheel 27 is rotated further in the arrow direction A of FIG. 3, in particular at high power of the electric motor 13, the sleeve part 25 is rotated at the same time in the arrow direction A as soon as the pin 29 strikes against the corresponding end of the slot 28. This has the consequence that the clamping rollers 30 are clamped against the outer circumference of the sleeve part 22 by the clamping ramps 25' and the sleeve parts 25 and 22 are accordingly coupled to each other. This then results, on further rotation of the gearwheel 27 in the arrow direction A, in the shaft 20, which is connected in a rotationally fixed manner to the sleeve part 22, being rotated at the same time in the arrow direction A and the coil 4 accordingly being rotated in the winding-up direction of the seat belt 1. In this manner, the above-explained, reversible belt tightening is made possible.

In a departure from the embodiment which is illustrated in the drawings, the irreversible tensioning device may, instead of being arranged on the coil 4, also be arranged on the buckle 3 or on the end fitting (not illustrated) of the lap belt which continues the illustrated chest belt 1 at the belt latch 2, the belt latch 2 being arranged in an easily displaceable manner on the belt.

The arrangement on the reel 4 is advantageous in order to achieve particularly good tightening of the belt in the chest region.

The arrangement on the end fitting brings about particularly good belt tightening in the lap region. An arrangement on the buckle makes possible a particularly good compromise with regard to tightening in the chest and lap region particularly in the case of a customary, combined chest and lap belt.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A belt tightener of a seat belt for an occupant on a seat in a vehicle, in particular a motor vehicle, comprising:
    a retracting device, which is actuated by a retracting spring, for automatically shortening the belt,
    an extension lock of the belt, the extension lock being effective at a predetermined deceleration or acceleration of the vehicle or of its bodywork, when a predetermined extension speed of the belt is exceeded or both at the predetermined deceleration or acceleration and when the predetermined extension speed is exceeded,
    an irreversible tensioning device which, on obtaining an accident signal, which can be produced by a sensory mechanism, briefly brings about an irreversible tightening of the belt with great force,
    a counterspring having a belt-remote abutment which can be adjusted by a motor arranged parallel to the retracting spring, and
    a normally open coupling arranged between the motor and the retracting device,
    wherein the motor can be reversed between two power ranges, and
    wherein the coupling closes automatically if the motor switches to high power and operates in its running direction provided to give reversible belt tightening.

2. The belt tightener according to claim 1, wherein at least one of the motor and a driving connection of the motor to the belt-remote abutment of the counterspring is designed to be self-locking.

3. The belt tightener according to claim 1, and further comprising a further coupling is arranged between the motor and abutment of the counterspring, the further coupling closing if the motor runs counter to its running direction for the reversible belt tightening.

4. The belt tightener according to claim 1, wherein the coupling is designed as a gradient coupling which closes when relatively large relative speeds or accelerations occur between the coupling inlet and coupling outlet in a relative direction.

5. The belt tightener according to claim 4, wherein the gradient coupling is designed as a clamping-roller free-wheeling device.

6. The belt tightener according to claim 3, wherein the further coupling is designed as a toothing-type coupling with axially intermeshing end toothing parts.

7. The belt tightener according to claim 1, wherein the motor is switched by a control circuit to its power and running direction provided for the reversible belt tightening if a sensor arrangement reports an accident-prone driving state.

8. The belt tightener according to claim 7, wherein the sensor arrangement monitors at least one of the fluid pressure of a service brake of the vehicle and accelerations or decelerations of the vehicle, and produces a warning signal if the fluid pressure, the accelerations or decelerations or both the fluid pressure and the accelerations or decelerations exceed respective threshold values.

9. The belt tightener according to claim 1, wherein the irreversible tensioning device is arranged on a belt buckle of a combined chest and lap belt.

10. The belt tightener according to claim 1, wherein said accident signal is a signal for triggering an air bag.

11. The belt tightener according to claim 1, wherein said irreversible tightening is brought about for about 10–15 ms.

12. The belt tightener according to claim 1, wherein said great force is about 4000N.

13. The belt tightener according to claim 2, and further comprising a further coupling is arranged between the motor and abutment of the counterspring, the further coupling closing if the motor runs counter to its running direction for the reversible belt tightening.

14. The belt tightener according to claim 2, wherein the coupling is designed as a gradient coupling which closes when relatively large relative speeds or accelerations occur between the coupling inlet and coupling outlet in a relative direction.

15. The belt tightener according to claim 14, wherein the gradient coupling is designed as a clamping-roller free-wheeling device.

16. The belt tightener according to claim 3, wherein the coupling is designed as a gradient coupling which closes when relatively large relative speeds or accelerations occur between the coupling inlet and coupling outlet in a relative direction.

17. The belt tightener according to claim 16, wherein the gradient coupling is designed as a clamping-roller free-wheeling device.

18. The belt tightener according to claim 4, wherein the further coupling is designed as a toothing-type coupling with axially intermeshing end toothing parts.

19. The belt tightener according to claim 5, wherein the further coupling is designed as a toothing-type coupling with axially intermeshing end toothing parts.

20. The belt tightener according to claim 2, wherein the motor is switched by a control circuit to its power and running direction provided for the reversible belt tightening if a sensor arrangement reports an accident-prone driving state.

21. The belt tightener according to claim 20, wherein the sensor arrangement monitors at least one of the fluid pressure of a service brake of the vehicle and accelerations or decelerations of the vehicle, and produces a warning signal if the fluid pressure, the accelerations or decelerations or both the fluid pressure and the accelerations or decelerations exceed respective threshold values.

22. The belt tightener according to claim 3, wherein the motor is switched by a control circuit to its power and running direction provided for the reversible belt tightening if a sensor arrangement reports an accident-prone driving state.

23. The belt tightener according to claim 22, wherein the sensor arrangement monitors at least one of the fluid pressure of a service brake of the vehicle and accelerations or decelerations of the vehicle, and produces a warning signal if the fluid pressure, the accelerations or decelerations or both the fluid pressure and the accelerations or decelerations exceed respective threshold values.

24. The belt tightener according to claim 4, wherein the motor is switched by a control circuit to its power and running direction provided for the reversible belt tightening if a sensor arrangement reports an accident-prone driving state.

25. The belt tightener according to claim 24, wherein the sensor arrangement monitors at least one of the fluid pressure of a service brake of the vehicle and accelerations or decelerations of the vehicle, and produces a warning signal if the fluid pressure, the accelerations or decelerations or both the fluid pressure and the accelerations or decelerations exceed respective threshold values.

26. The belt tightener according to claim 5, wherein the motor is switched by a control circuit to its power and running direction provided for the reversible belt tightening if a sensor arrangement reports an accident-prone driving state.

27. The belt tightener according to claim 26, wherein the sensor arrangement monitors at least one of the fluid pressure of a service brake of the vehicle and accelerations or decelerations of the vehicle, and produces a warning signal if the fluid pressure, the accelerations or decelerations or both the fluid pressure and the accelerations or decelerations exceed respective threshold values.

28. The belt tightener according to claim 6, wherein the motor is switched by a control circuit to its power and running direction provided for the reversible belt tightening if a sensor arrangement reports an accident-prone driving state.

29. The belt tightener according to claim 28, wherein the sensor arrangement monitors at least one of the fluid pressure of a service brake of the vehicle and accelerations or decelerations of the vehicle, and produces a warning signal if the fluid pressure, the accelerations or decelerations or both the fluid pressure and the accelerations or decelerations exceed respective threshold values.

30. The belt tightener according to claim 2, wherein the irreversible tensioning device is arranged on a belt buckle of a combined chest and lap belt.

31. The belt tightener according to claim 3, wherein the irreversible tensioning device is arranged on a belt buckle of a combined chest and lap belt.

32. The belt tightener according to claim 4, wherein the irreversible tensioning device is arranged on a belt buckle of a combined chest and lap belt.

33. The belt tightener according to claim 5, wherein the irreversible tensioning device is arranged on a belt buckle of a combined chest and lap belt.

34. The belt tightener according to claim 6, wherein the irreversible tensioning device is arranged on a belt buckle of a combined chest and lap belt.

35. The belt tightener according to claim 7, wherein the irreversible tensioning device is arranged on a belt buckle of a combined chest and lap belt.

36. The belt tightener according to claim 8, wherein the irreversible tensioning device is arranged on a belt buckle of a combined chest and lap belt.

* * * * *